(12) United States Patent
Abrahamson et al.

(10) Patent No.: US 7,830,853 B2
(45) Date of Patent: Nov. 9, 2010

(54) TECHNIQUES FOR SUPPORTING GSM TO W-CDMA RESELECTION

(75) Inventors: Kurt William Abrahamson, Carlsbad, CA (US); Michael Kevin Spartz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1728 days.

(21) Appl. No.: 10/383,793

(22) Filed: Mar. 6, 2003

(65) Prior Publication Data

US 2004/0109431 A1 Jun. 10, 2004

Related U.S. Application Data

(60) Provisional application No. 60/431,322, filed on Dec. 6, 2002.

(51) Int. Cl.
*H04B 7/216* (2006.01)
(52) U.S. Cl. .................................. 370/342; 455/552.1
(58) Field of Classification Search ............. 455/552.1, 455/432.1, 436, 561, 435.2; 370/349, 342, 370/328
See application file for complete search history.

(56) References Cited

U.S. PATENT DOCUMENTS 6,788,959 B2 * 9/2004 Jokinen et al. ........... 455/552.1
6,845,095 B2 * 1/2005 Krishnarajah et al. ....... 370/349
7,283,497 B2 * 10/2007 Mueller ....................... 370/331
2003/0040331 A1 * 2/2003 Zhao .......................... 455/552

FOREIGN PATENT DOCUMENTS

GB 2289191 4/1994

* cited by examiner

*Primary Examiner*—Lester Kincaid
*Assistant Examiner*—Phuoc Doan
(74) *Attorney, Agent, or Firm*—Darren M. Simon

(57) ABSTRACT

Techniques to support cell reselection from GSM to W-CDMA. A dual-mode terminal determines whether or not the GSM network that it is currently camped on supports Release 99 functionality and hence whether or not the GSM network is capable of broadcasting information for W-CDMA neighbor cells. This determination may be made based on the settings for certain status bits in messages transmitted by the GSM network and/or other information available to the terminal. The terminal can initiate a search for W-CDMA cells if it is deemed that the current GSM network does not support Release 99 functionality. The terminal may also determine the scope of the W-CDMA search and when to perform the W-CDMA search based on information stored by the terminal. The reselection from GSM to W-CDMA may be achieved based on measurements obtained from the W-CDMA search and other pertinent information (e.g., threshold values used to compare the measurements).

25 Claims, 4 Drawing Sheets

TECHNIQUES FOR SUPPORTING GSM TO W-CDMA RESELECTION

RELATED APPLICATIONS

This application claims the benefit of provisional U.S. application Ser. No. 60/431,322, entitled "Techniques for Supporting GSM to WCDMA Reselection," filed Dec. 6, 2002, assigned to the assignee of the present application, and incorporated herein by reference in its entirety for all purposes.

BACKGROUND

1. Field

The present invention relates generally to communication, and more specifically to techniques for supporting GSM to W-CDMA reselection.

2. Background

Wireless communication systems are widely deployed to provide various types of services such as voice, packet data, and so on. These systems may be multiple-access systems capable of supporting communication with multiple users by sharing the available system resources. Examples of such multiple-access systems include time division multiple access (TDMA) systems and code division multiple access (CDMA) systems. A TDMA system may implement one or more standards such as Global System for Mobile Communications (GSM). A CDMA system may implement one or more standards such as Wideband CDMA (W-CDMA), IS-2000, and IS-95. GSM and IS-95 are second generation (2G) standards for TDMA and CDMA, respectively, and W-CDMA and IS-2000 are both third generation (3G) standards for CDMA. These standards are well known in the art.

GSM is a radio access technology (RAT) that can provide voice service and low to medium rate packet data service. GSM networks are widely deployed throughout the world. W-CDMA is a new radio access technology that can provide enhanced services and capabilities (e.g., higher data rates, concurrent voice and data calls, and so on). One of the key requirements in the development of W-CDMA is to enable seamless operation with existing GSM networks. W-CDMA thus provides various capabilities to enable interworking with GSM networks. By providing these capabilities, multi-RAT terminals (e.g., dual-mode cellular phones) that support both W-CDMA and GSM may be manufactured and used by subscribers to obtain the performance advantages of W-CDMA and the coverage benefits of GSM, all with the same terminal.

To support seamless operation with W-CDMA networks, additional capabilities are defined for GSM and specified in Release 99 version of the GSM standard. One of these additional capabilities is the ability for a GSM network to broadcast information for neighboring W-CDMA cells. This broadcast information allows dual-mode terminals operating on the GSM network to learn of the presence of W-CDMA cells. Moreover, the broadcast information includes cell-specific information that may be used by the dual-mode terminals to quickly acquire the W-CDMA cells. Such cell-specific information includes, for each W-CDMA cell, (1) the frequency and primary scrambling code used by the W-CDMA cell and (2) whether or not diversity mode is employed by the W-CDMA cell.

W-CDMA and GSM each provide a "cell reselection" process whereby a terminal operating on one network determines a suitable cell in another network from which it plans to receive available services. A "cell" can refer to a base station in a network and/or the coverage area of the base station, depending on the context in which the term is used. Cell reselection procedures are performed while the terminal is in idle mode so that even as the environment of the terminal changes (e.g., due to movement of the terminal or changing channel conditions), the terminal can monitor the network for incoming pages and be prepared to originate a connection whenever the user desires.

A dual-mode terminal can measure both GSM neighbor cells and W-CDMA neighbor cells to determine the best cell on which to "camp". If the dual-mode terminal is currently camped on a GSM cell, then the measurements for W-CDMA neighbor cells may be made based on the cell-specific information broadcast by the GSM cell. If the measurements and the cell reselection procedures indicate that there is a W-CDMA cell ranked higher than the current GSM cell, then the terminal can switch to W-CDMA mode and camp on the better W-CDMA cell.

Currently, most deployed GSM networks support either Release 97 or Release 98 version of the GSM standard. These GSM networks are not able to broadcast information for neighboring W-CDMA cells in the manner specified in the Release 99 version of the GSM standard. A dual-mode terminal operating in a "pre-Release 99" GSM network (i.e., one supporting a release prior to Release 99) may not be aware of neighboring W-CDMA cells and may therefore be "stuck" on the GSM network.

There is therefore a need in the art for techniques to support cell reselection from GSM to W-CDMA for pre-Release 99 GSM networks.

SUMMARY

Techniques are provided herein to support cell reselection from GSM to W-CDMA. These techniques do not require Release 99 functionality in GSM networks (i.e., do not rely on broadcast information for neighboring W-CDMA cells). These techniques allow dual-mode terminals to perform cell reselection from a GSM cell to a W-CDMA cell in deployments with pre-Release 99 GSM networks.

A dual-mode terminal determines whether or not the GSM network that it is currently camped on supports Release 99 functionality (i.e., supports Release 99 or a later version of the GSM standard). This determination may be made based on the settings for certain status bits in messages transmitted by the GSM network on the downlink and/or other information available to the terminal. The terminal can initiate a search for W-CDMA cells if it is deemed that the current GSM network does not support Release 99 functionality.

The terminal may also determine the scope of the W-CDMA search and when to perform the W-CDMA search based on information stored by the terminal. The scope of the W-CDMA search may be determined based on a database of W-CDMA networks maintained by the terminal. This database may include, for example, association between GSM networks and W-CDMA networks, where the association may be ascertained by prior operation on these networks. The W-CDMA search may be performed at a designated time, which may be determined based on various considerations such as, for example, the scope of the search to be performed, the age of the information used for the search, and so on. The reselection from GSM to W-CDMA may be achieved based on measurements obtained from the W-CDMA search and other pertinent information such as, for example, threshold values used to compare the measurements. Various details for the cell search and reselection are described below.

In general, the cell reselection techniques described herein may be used to perform cell reselection between any two networks in which some versions of a first network (e.g., a GSM network) do not broadcast neighbor cell information for a second network (e.g., a W-CDMA network). Some other means are then used to determine whether or not to search for cells in the second network when the neighbor cell information is not broadcast by the first network.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1A:
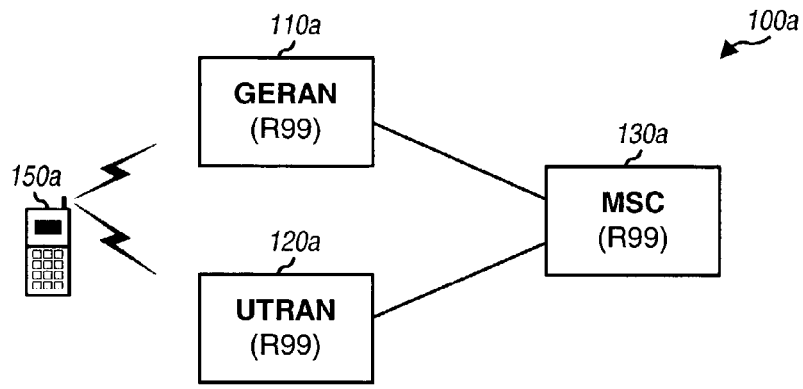
FIGS. 1A through 1C show three different deployments of PLMNs that include GERANs and UTRANs of different release versions.

FIG. 1A shows a diagram of a public land mobile network (PLMN) 100a that includes a GSM/EDGE Radio Access Network (GERAN) 110a and a Universal Terrestrial Radio Access Network (UTRAN) 120a. GERAN 110a is a GSM network that, in this embodiment, supports Release 99 or a later version of the GSM standard. UTRAN 120a is a W-CDMA network that, in this embodiment, supports Release 99 or a later version of the W-CDMA standard. (Release 99 is the first version of the W-CDMA standard.) For simplicity, the label "R99" in FIGS. 1A through 1C denotes Release 99 or a later version of the applicable standard, and the label "pre-R99" denotes a version of the standard that is earlier than Release 99.

In FIG. 1A, the GSM network and W-CDMA network are two radio access networks employing different radio access technologies (GSM and W-CDMA) but belonging to the same PLMN. A radio access network supports over-the-air communication between terminals and base stations in the network. Each radio access network typically includes multiple cells, where a "cell" can refer to a base station and/or its coverage area depending on the context in which the term is used.

A mobile switching center (MSC) 130a couples to both GERAN 110a and UTRAN 120a and supports communication and interworking between these two networks. MSC 130a performs non-access stratum (NAS) functions such as call state management, mobility support, and so on. In this embodiment, MSC 130a supports Release 99 or a later version of the Non Access Stratum protocols and Mobile Application Part (MAP) standard, which specifies the mobile networking protocol that allows for roaming and advanced services. MAP is the networking protocol used for GSM and W-CDMA networks, and ANSI-41 is the counterpart networking protocol used for IS-95 and IS-2000 networks.

The network deployment shown in FIG. 1A has all network entities supporting Release 99 or a later version of their respective standards. A dual-mode terminal 150a is then able to receive services from both GERAN 110a and UTRAN 120a. While operating on GERAN 110a, terminal 150a can receive broadcast information for neighboring W-CDMA cells and can perform cell reselection to W-CDMA cells, if they are ranked higher than GSM cells. GSM to W-CDMA cell reselection procedures for Release 99 and later are defined in the applicable standards and are well known in the art.

Figure 1B:
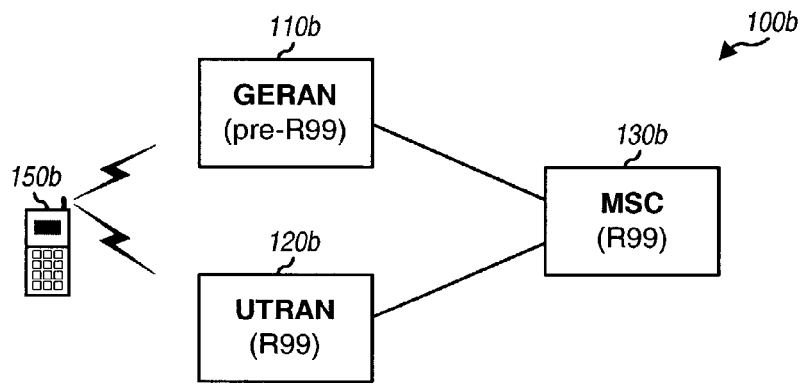

FIG. 1B shows a diagram of a PLMN 100b that includes a GERAN 110b and a UTRAN 120b. In this embodiment, GERAN 110b supports a pre-Release 99 (e.g., Release 97 or Release 98) version of the GSM standard while UTRAN 120b supports Release 99 or a later version of the W-CDMA standard. An MSC 130b couples to both GERAN 110b and UTRAN 120b and supports Release 99 or a later version of the MAP standard.

For the network deployment shown in FIG. 1B, GERAN 110b does not broadcast pertinent information for neighboring W-CDMA cells that can be used by a dual-mode terminal 150b to search for these W-CDMA cells. Some other mechanisms would then be needed to perform cell reselection from GSM to W-CDMA.

Figure 1C:
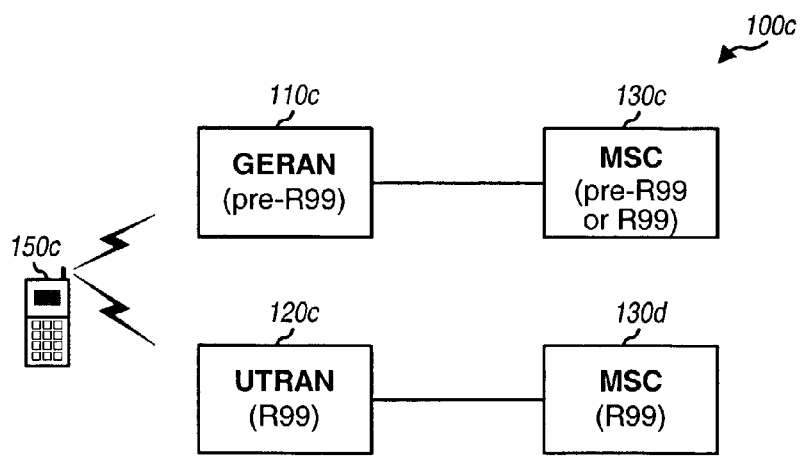

FIG. 1C shows a diagram of a PLMN 100c that includes a GERAN 110c and a UTRAN 120c. In this embodiment, GERAN 110c also supports a pre-Release 99 version of the GSM standard while UTRAN 120c supports Release 99 or a later version of the W-CDMA standard. An MSC 130c couples to GERAN 110c and may support any version of the MAP standard (e.g., Release 97, Release 99, and so on). An MSC 130d couples to UTRAN 120c and supports Release 99 or a later version of the MAP standard. Although GERAN 110c and UTRAN 120c are not coupled to the same MSC, a dual-mode terminal 150c may still be able to receive service from both GERAN 110c and UTRAN 120c.

For the network deployment shown in FIG. 1C, GERAN 110c also does not broadcast pertinent information for neighboring W-CDMA cells that can be used by dual-mode terminal 150c to search for these W-CDMA cells. Again, some other mechanisms would be needed to perform cell reselection from GSM to W-CDMA.

Techniques are provided herein to support cell reselection from GSM to W-CDMA that do not require Release 99 functionality in GSM networks. These techniques may advantageously be used for network deployments with pre-Release 99 GSM networks, such as those shown in FIGS. 1B and 1C. These network deployments may arise for various reasons. As noted above, most deployed GSM networks currently support either Release 97 or Release 98 (i.e., pre-Release 99) version of the GSM standard. It is expected that network operators that deploy W-CDMA networks will eventually upgrade their GSM networks to Release 99 or later so that these GSM networks will have the new functionality to support seamless operation across GSM and W-CDMA. However, since deploying W-CDMA networks requires significant financial resources, the network operators may elect to save on the costs of upgrading their GSM networks, unless such upgrade is absolutely necessary. Moreover, even if such upgrade were to take place, some amount of time will be required to implement the upgrade. There will be an interim period during which some or many pre-Release 99 GSM networks are not yet upgraded and will not have Release 99 functionality.

The cell reselection techniques described herein allow dual-mode terminals to perform cell reselection in deployments with pre-Release 99 GSM networks. These techniques can also advantageously avoid the situation whereby a dual-mode terminal gets "stuck" on a pre-Release 99 GSM network. This situation may occur if the dual-mode terminal originally operates on a W-CDMA cell and then reselects to a GSM cell according to the cell reselection procedures defined by W-CDMA. If the GSM cell does not support Release 99 functionality, then the dual-mode terminal may not be aware of neighboring W-CDMA cells and may then be stuck on the GSM network. This situation may be likely to arise especially if the terminal is mobile and moves about the network.

Figure 2:
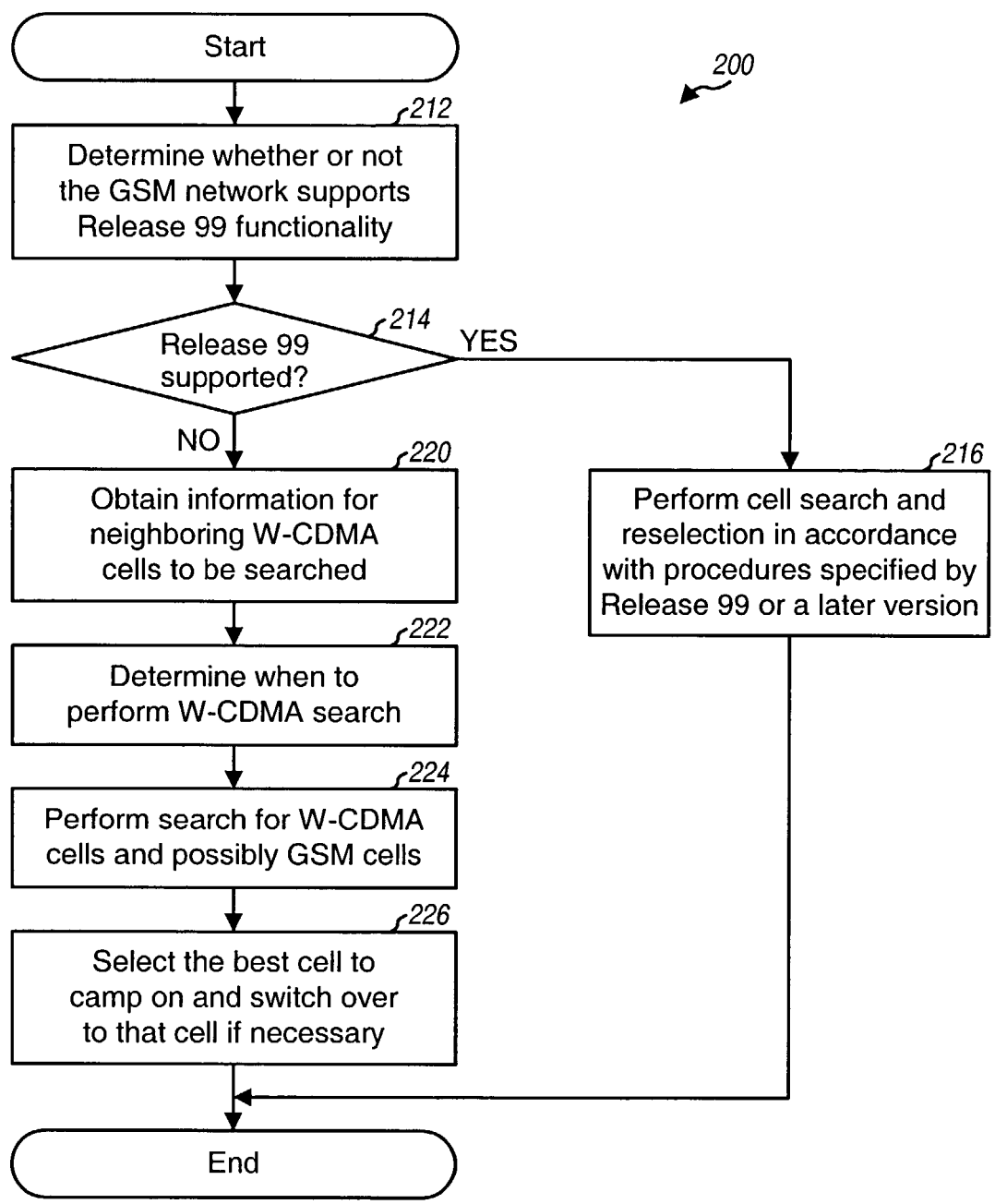
FIG. 2 shows a flow diagram of a process for performing cell reselection from GSM to W-CDMA, and which does not require Release 99 functionality.

FIG. 2 shows a flow diagram of a process 200 for performing cell reselection from GSM to W-CDMA, which does not require Release 99 functionality. Process 200 may be performed by a dual-mode terminal if it is currently camped on a GSM cell in a GSM network.

Initially, the terminal determines whether or not the GSM network supports Release 99 functionality (step 212). This determination may be made in various manners as described below. For example, this determination may be made based on the settings for certain status bits in messages transmitted by the GSM network on the downlink and/or other information available to the terminal.

If it is determined that the GSM network supports Release 99 functionality (i.e., the answer to step 214 is yes), then the terminal can perform cell search and reselection in accordance with procedures defined by Release 99 or a later version of the standard (step 216). The terminal may receive broadcast information from the GSM cell and obtain pertinent information for neighboring W-CDMA cells, and may search for these W-CDMA cells using this information.

Otherwise, if the answer to step 214 is no, then alternative procedures may be used to perform cell reselection from GSM to W-CDMA. For the first part of the alternative procedures, information for neighboring W-CDMA cells to be searched is obtained (step 220). This information may be stored in a non-volatile memory within the terminal, as described below. The terminal then determines when to perform the W-CDMA search (step 222). W-CDMA cells may be searched whenever GSM cells are searched, or may be searched at a more frequent rate or a less frequent rate, as described below.

At the designated time determined in step 222, the terminal performs a search for W-CDMA cells using the information obtained in step 220 (step 224). GSM cells may also be searched at this time. Upon completing the search, the terminal selects the best cell to camp on based on measurements obtained for W-CDMA cells and possibly GSM cells found in the search (step 226). If the best cell is different from the current GSM cell, then the terminal switches over to, and camps on, this new best cell until the next search. From steps 216 and 226, the process terminates. Process 200 represents one iteration of the GSM to W-CDMA cell reselection procedures and may be performed by the terminal periodically or whenever invoked.

In essence, step 212 determines whether or not to search for W-CDMA cells, step 220 determines what W-CDMA networks to search (i.e., the scope of the search), and step 222 determines when to perform the W-CDMA search. The W-CDMA search is performed in step 224 based on the information obtained in step 220 and at the designated time determined in step 222. Steps 212 and 220 through 226 are each described in further detail below.

1. Whether or Not to Search for W-CDMA Cells

The determination for whether or not to search for W-CDMA cells may be needed for various operating scenarios. For example, the terminal may be camping on a GSM cell and a search for W-CDMA cells that may be better than the current GSM cell is desirable, unless it is known with certainty that no neighboring W-CDMA cells are present. As another example, the terminal may just be powered on and the last network on which the terminal received service or camped on may be a GSM network. In this case, it may be desirable to search for W-CDMA cells on that network at power on. As yet another example, the terminal may have lost coverage while operating on a GSM network, and it may again be desirable to search for W-CDMA cells when the terminal receives coverage again.

In general, different information may be used to determine whether or not to search for W-CDMA cells, depending on the operating scenarios. A W-CDMA search may be performed if it is determined that the GSM network that the terminal is currently camped on (i.e., the current GSM network) does not support Release 99 functionality and is not able to broadcast information for neighboring W-CDMA cells. A W-CDMA search may also be performed if the current GSM network is associated with a W-CDMA network. A W-CDMA search may also be performed if, upon powering on or entering coverage, the last used access technology for the registered PLMN is determined to be a GSM network, and this network is determined to be pre-Release 99. A W-CDMA search may also be performed for other operating scenarios, and the determination for whether or not to perform the search may be made based on other information, and this is within the scope of the invention.

The determination for whether or not the current GSM network supports Release 99 functionality may be made in various manners. The fact that a GSM network does not support Release 99 functionality is not fully indicative of the presence of W-CDMA cells. However, a W-CDMA search may be performed if the current GSM network is deemed to be pre-Release 99 because of the possibility of the presence of W-CDMA cells, which are not broadcasted by the pre-Release 99 GSM network.

The terminal can ascertain whether or not the current GSM network supports Release 99 functionality based on messages received from this GSM network. Release 99 version of GSM defines an MSC Release (MSCR) bit that is set as follows:

"0"=MSC is Release 98 or older, and

"1"=MSC is Release 99 or newer.

The MSCR bit is included in a Control Channel Description information element, which is carried in a System Information Type 3 message. This message is sent on the broadcast channel (BCCH) by each cell in the GSM network to provide cell identity and other information about the cell. Specific procedures on how to use the MSCR bit is described in a document 3GPP TS 24.007. This document and other 3GPP and GSM documents listed herein are publicly available.

The terminal can monitor the MSCR bit in a received System Information Type 3 message and can deem that the current GSM network does not support Release 99 functionality if this bit is not set. The MSCR bit indicates the release version of the MSC. However, the MSCR bit is set by the base station transmitting the message that includes this bit. The MSCR bit can be set only by base stations and networks that support Release 99 or a later release. Thus, if the MSCR bit is set, then the GSM network supports Release 99 functionality. Conversely, if the MSCR bit is not set, then it can be presumed that the GSM network does not support Release 99 functionality.

Release 99 version of GSM also defines an SGSN Release (SGSNR) bit that is set as follows:

"0"=SGSN is Release 98 or older, and

"1"=SGSN is Release 99 or newer.

A GPRS Support Node (GSN) is a network entity that provides mobility management and packet data interface to external networks (e.g., the Internet). The GSN is the counterpart to the MSC and performs non-access stratum functions for packet data service. A Serving GPRS Support Node (SGSN) is the GSN currently serving a terminal. The SGSNR bit is included in a System Information 13 Rest Octets information element, which is carried in a System Information Type 13 message sent on the BCCH and also a Packet System Information Type 1 message sent on a packet broadcast channel (PBCCH). The terminal can monitor the SGSNR bit in a received System Information Type 13 or Packet System Information Type 1 message and can deem that the GSM network does not support Release 99 functionality if this bit is not set. The SGSNR bit indicates the release version supported by the SGSN, but this bit is also set by the base station. Thus, similar to the MSCR bit, if the SGSNR bit is not set then it can be presumed that the GSM network does not support Release 99 functionality.

The MSCR bit, Control Channel Description information element, and System Information Type 3 message are described in a document 3GPP TS04.18, sections 9.1.35 and 10.5.2.11. The SGSNR bit, System Information 13 Rest Octets information element, and System Information Type 13 message are described in sections 9.1.43a and 10.5.2.37b of 3GPP TS 04.18. The Packet System Information Type 1 message is described in a document GSM 04.60, section 11.2.18.

The terminal may also initiate a search for W-CDMA cells based on information in a database maintained by the terminal. This database may include the W-CDMA and GSM networks on which the terminal has camped on in the past. GSM networks may be associated with W-CDMA networks, and this association may also be stored in the database. For example, the network ID of GSM networks associated with W-CDMA networks may be stored in the database. If the network ID for the current GSM network is present in the database, then information for the associated W-CDMA network may be used to perform W-CDMA search. The information in the database may thus be used, as if it were received from the GSM network, by the terminal to infer that neighboring W-CDMA cells may be present even though broadcast information is not received for these cells.

The terminal may also initiate a search for W-CDMA cells based on information stored for the last PLMN with which the terminal has registered. The terminal may store information for the last used access technology for the registered PLMN (RPLMN) in an elementary file $EF_{RPLMNAcT}$, which is stored in a GSM Subscriber Identity Module (SIM) or a Universal Subscriber Identity Module (USIM). This file contains an Access Technology field that includes information for the last access technology used by the terminal (e.g., prior to powering down or losing coverage). If it is determined that GSM was the last access technology (based on information in the elementary file $EF_{RPLMNAcT}$) and (optionally) if it is deemed that the GSM network is pre-Release 99 (based on some other information), then the terminal can initiate a W-CDMA search (e.g., upon powering up or entering coverage). The elementary file $EF_{RPLMNAcT}$ for the USIM is described in a document 3GPP TS 31.102, section 4.2.56.

2. What to Search

If it is determined that the GSM network does not support Release 99 functionality, then the terminal may obtain pertinent information to perform a W-CDMA search from another source instead of broadcast messages from the GSM network. In an embodiment, the terminal stores in a non-volatile memory some information for each W-CDMA network that it has previously camped on. The stored information for each W-CDMA network may include, for example, the following:
   a network ID for the W-CDMA network;
   a set of frequencies used by W-CDMA cells on the W-CDMA network; and
   a set of primary scrambling codes used by the W-CDMA cells on the W-CDMA network.

The stored information may be used to perform and expedite the search for W-CDMA cells.

The amount of information to be stored may be kept to a small size to reduce the memory requirements, since memory may be a significant cost component of a terminal. The terminal may thus store any one or any combination of the information enumerated above, or some other information, for each W-CDMA network. The stored information may also be aged so that stale information is discarded from memory. For example, if the terminal has not operated on a particular W-CDMA network for a particular period of time (e.g., a particular number of hours or days), then the information for that network may be removed from memory. The frequency of the W-CDMA search may be made dependent on the age and/or the amount of available information, as described below.

The terminal may also store the association (i.e., mapping) of GSM networks to W-CDMA networks. This association may be used to limit the scope of the W-CDMA search. In an embodiment, the terminal searches only for W-CDMA cells in the W-CDMA network(s) associated with the current GSM network. In another embodiment, the terminal stores W-CDMA neighbor cells for the few most recent GSM cells on which the terminal has camped. This association may be stored in a neighbor list maintained for each of these most recent GSM cells, where each neighbor list may be built up by the terminal when performing reselection from GSM to W-CDMA. The terminal may then search only for W-CDMA cells associated with the GSM cell on which it is currently camped.

In general, it is not absolutely necessary to store information for W-CDMA networks and cells to be searched. If information is available, then a "condensed" search may be performed for a smaller search space (e.g., a limited number of frequencies and scrambling codes). If no information is available for W-CDMA networks, then an extensive or expanded search may be performed to search for more W-CDMA frequencies and/or scrambling codes for which W-CDMA cells might be found. An exhaustive search may also be performed to search for all possible W-CDMA frequencies and all possible scrambling codes.

The stored information can expedite the W-CDMA search process and shorten the search time (i.e., enable a condensed search to be performed). However, even if such information is available, an extensive or exhaustive search may be performed periodically to search for W-CDMA cells that may not be known to the terminal (e.g., if the terminal has moved to a new region).

3. When to Search

A network operator may deploy multiple PLMNs, each of which covers a particular region. Each PLMN may be identified by a unique combination of a Mobile Country Code (MCC) and a Mobile Network Code (MNC). For each subscriber, one of the PLMNs is designated as the home PLMN (HPLMN) and the MCC and MNC for this PLMN are stored in the subscriber's SIM or USIM. If the terminal camps on a PLMN whose MCC and MNC do not match the home MCC and MNC stored on the SIM or USIM, then this PLMN is considered as a visited PLMN (VPLMN).

W-CDMA defines a mechanism whereby a terminal operating on a VPLMN periodically attempts to obtain service on its HPLMN or a higher priority PLMN. This mechanism is referred to as an HPLMN background search mechanism and is described in a document 3GPP TS 23.122, section 4.4.3.3. The HPLMN background search is performed periodically if the terminal is roaming and in idle mode. The first HPLMN background search is performed between 2 to T minutes from the time the terminal is powered on, and each subsequent background search is performed T minutes from the prior background search. The value for the parameter T may be configured by the network operator and is stored in an elementary file $EF_{HPLMN}$, which is stored in a SIM or a USIM. If a value is not specified for T, then a default value of 60 minutes is used for the background search. The elementary file $EF_{HPLMN}$ for the SIM is described in document 3GPP TS 31.102, section 4.2.6.

Searches for W-CDMA cells may be performed periodically at regular time intervals. In one embodiment, W-CDMA searches may be performed automatically by the terminal at the same time that HPLMN background searches are performed (i.e., every T minutes, except for the first background search which is between 2 and T minutes from power on). In another embodiment, W-CDMA searches may be performed at time intervals that are less than or greater than T minutes. The time duration between W-CDMA searches may be indicated by a parameter $T_{WCDMA}$, which may be stored in non-volatile memory for the terminal. The use of a separate $T_{WCDMA}$ parameter for the time period between W-CDMA searches allows the terminal to perform W-CDMA searches at the desired frequency.

The value for the $T_{WCDMA}$ parameter may be configured by the network operator, manually selected by the user, or determined in some other manner. Moreover, the $T_{WCDMA}$ value may be a fixed value or a dynamically adjustable value. For example, the frequency of the W-CDMA search may be dependent on (1) the age of the information for W-CDMA networks stored in non-volatile memory for the terminal, (2) the amount of information available for W-CDMA networks, (3) some other factors, or (4) any combination thereof. The $T_{WCDMA}$ value may also be derived based on W-CDMA information. For example, W-CDMA defines a system parameter (S search, GSM) that determines when to search based on the signal strength of the serving W-CDMA cell. This W-CDMA system parameter may be mapped to a $T_{WCDMA}$ value.

W-CDMA searches may also be performed only when invoked, instead of automatically. For example, a W-CDMA search may be performed whenever the user initiates the search. As another example, a W-CDMA search may be performed if the terminal enters coverage after losing coverage of the last GSM network.

4. W-CDMA Search

The search for W-CDMA cells is performed at the designated time and may be performed in various manners. In one embodiment, the terminal searches for W-CDMA cells in the HPLMN as well as the serving PLMN. The W-CDMA search may be performed in the same manner as for the HPLMN background search (which is specified in 3GPP TS 23.122) but with a possibly expanded PLMN list that includes the serving PLMN. Moreover, whereas the HPLMN background search is specified to be performed when the terminal is in a VPLMN, the W-CDMA search is performed even if the terminal is camped on a cell in the HPLMN.

The W-CDMA search may be performed based on information obtained for neighboring W-CDMA cells. This information can reduce the scope of the search to a designated frequency and scrambling code space. As noted above, an extensive/expanded search or an exhaustive search may be performed if this information is not available, or every so often even if the information is available.

The terminal may or may not perform a search for GSM cells concurrent with the search for W-CDMA cells. A GSM search may be performed to look for a better GSM cell than the current GSM cell. A GSM search may be performed whenever the HPLMN background search is performed, which may be at the same or different frequency than the W-CDMA search.

5. GSM to W-CDMA Cell Reselection

At the conclusion of a W-CDMA search, the terminal may obtain a set of measurements for W-CDMA cells found by the search. A GSM search may also be performed concurrent with the W-CDMA search, in which case the terminal may obtain another set of measurements for GSM cells found by the GSM search. These measurements may relate to energy-per-chip-to-total-noise ratio (Ec/No), received signal code power (RSCP), or some other measure of signal quality. The measurements obtained for W-CDMA cells, non-serving GSM cells, and the current GSM cell may then be used to perform cell reselection.

The algorithm for performing cell reselection from GSM to W-CDMA is described in a document 3GPP TS 05.08, section 6.6.5. For this algorithm, the terminal reselects to a suitable W-CDMA cell if (1) the measured RSCP value for the W-CDMA cell exceeds those of the current GSM cell and suitable GSM cells by a particular offset threshold (XXX_Qoffset) for a specified period of 5 seconds, where XXX indicates other access technology/mode, and (2) for a frequency division duplex (FDD) system with separate frequency bands for the downlink and uplink, the measured Ec/No value of the W-CDMA cell exceeds a particular minimum Ec/No threshold (FDD_Qmin). The XXX_Qoffset and FDD_Qmin are broadcast by GSM cells on the broadcast channel as part of GSM system information.

If the XXX_Qoffset and FDD_Qmin thresholds are not available from broadcast information because the current GSM cell does not support Release 99 functionality, then these thresholds may be obtained in other manners. In an embodiment, these thresholds may be configured for the terminal and stored in non-volatile memory for the terminal. In another embodiment, the thresholds may be ignored or calculated based on other information available to the terminal. For example, the minimum Ec/No threshold (FDD_Qmin) may be ignored and the offset threshold (XXX_Qoffset) may be calculated from W-CDMA offset information. This W-CDMA offset information may be obtained, for example, from prior W-CDMA networks on which the terminal has camped (i.e., received by the terminal via the broadcast channel), from the database maintained by the terminal for W-CDMA networks, and so on. In general, the thresholds XXX_Qoffset and FDD_Qmin are selected such that the terminal does not reselect to a W-CDMA cell and then quickly, as a result of W-CDMA reselection procedures, reselect back to a GSM cell.

The algorithm for performing cell reselection from W-CDMA to GSM is described in a document 3GPP TS 25.304, section 5.2.6.1.4. For this algorithm, the terminal reselects a suitable GSM cell based on comparison of the signal strength measurements for the serving cell and neighbor cells, with addition of hysteresis and offset values which are broadcast as part of W-CDMA system information.

Figure 3:
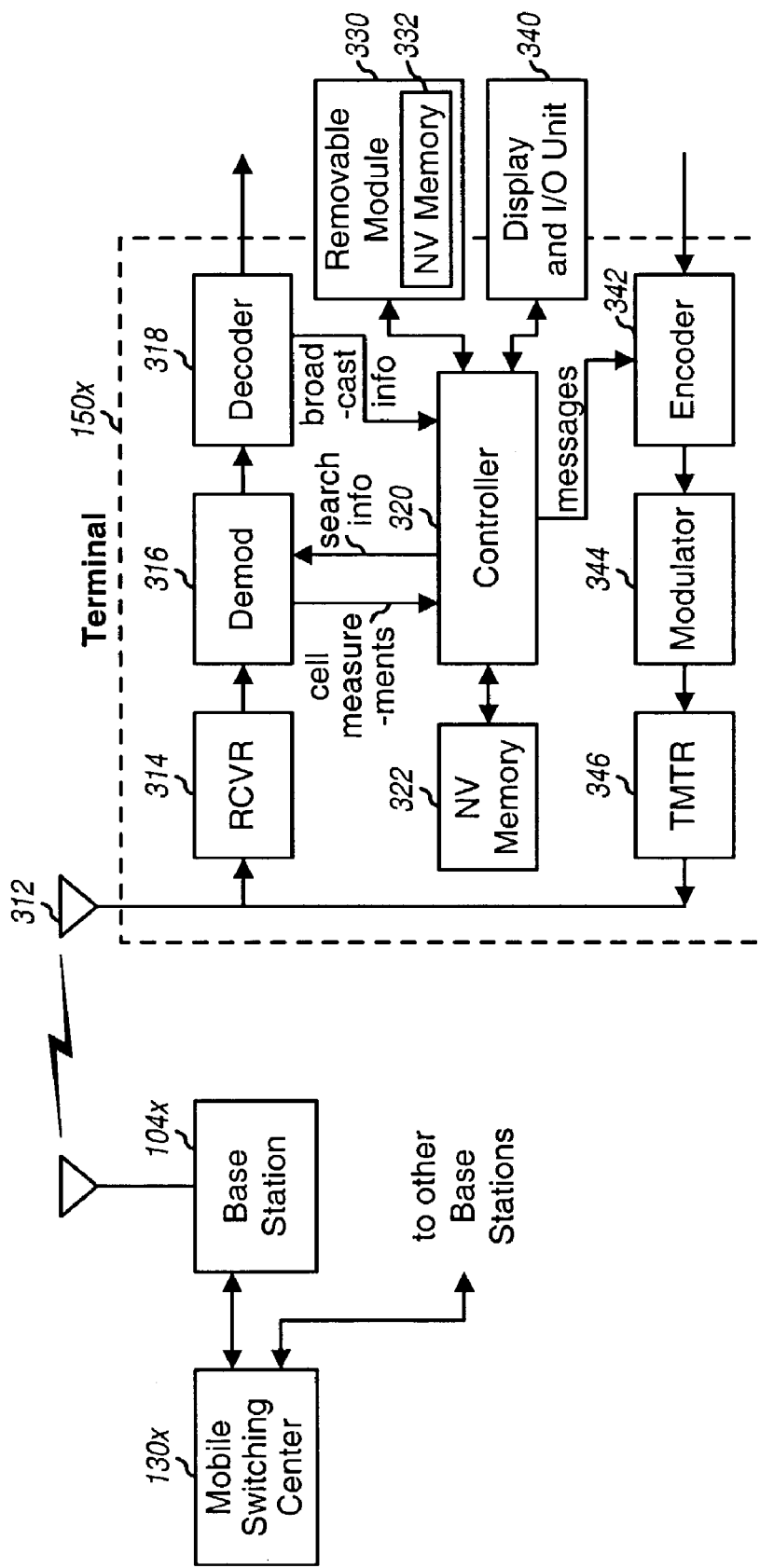
FIG. 3 shows a block diagram of a terminal.

FIG. 3 shows a block diagram of a terminal 150a capable implementing the GSM to W-CDMA reselection techniques described herein.

On the downlink, an antenna 312 receives downlink signals transmitted from multiple base stations for GSM and/or W-CDMA cells (only one base station 104x is shown in FIG. 3 for simplicity). The received signal from antenna 312 is provided to a receiver unit (RCVR) 314 and conditioned (e.g., filtered, amplified, frequency downconverted, and digitized) to provide data samples. A demodulator (Demod) 316 then demodulates the data samples based on GSM and/or W-CDMA physical layer processing, depending on the access technology of the cell being recovered. A decoder 318 further decodes the demodulated data to provide decoded data, which may include user-specific data and/or broadcast information transmitted by the GSM and W-CDMA cells. The recovered user-specific data and/or broadcast information may be provided to a controller 320 and/or a non-volatile (NV) memory unit 322.

On the uplink, data and messages (e.g., for registering with a reselected W-CDMA cell) to be sent by the terminal are provided to an encoder 342, which formats and encodes the data/messages. The coded data/messages is then modulated by a modulator 344 and further conditioned by a transmitter unit (TMTR) 346 to provide an uplink signal, which is then transmitted back to the base station for the GSM cell on which the terminal is currently camped. This base station receives and processes the uplink signal to recover the data/messages sent by the terminal, and may forward the messages to a mobile switching center (MSC) 130a for further processing.

Controller 320 directs the operation of various processing units within terminal 150x. For example, controller 320 may direct and/or perform the processing to support GSM to W-CDMA reselection. Memory unit 322 provides storage for program codes and data used by controller 320. For example, memory unit 322 may be used to store the database of W-CDMA information, the value for the $T_{WCDMA}$ parameter, the XXX_Qoffset and FDD_Qmin thresholds used for selecting the best cell, and so on. A removable module 330 includes a non-volatile memory 332 that stores elementary files with information that may be used to perform cell reselection. These elementary files may include the elementary file $EF_{H\text{-}PLMN}$ that contains the value for the time between HPLMN background searches (i.e., the T parameter), the elementary file $EF_{RPLMNAcT}$ that contains the radio access technology of the most recently registered PLMN, and so on. Removable module 330 may be a SIM, a USIM, or some other type of module with a non-volatile memory.

Figure 4:
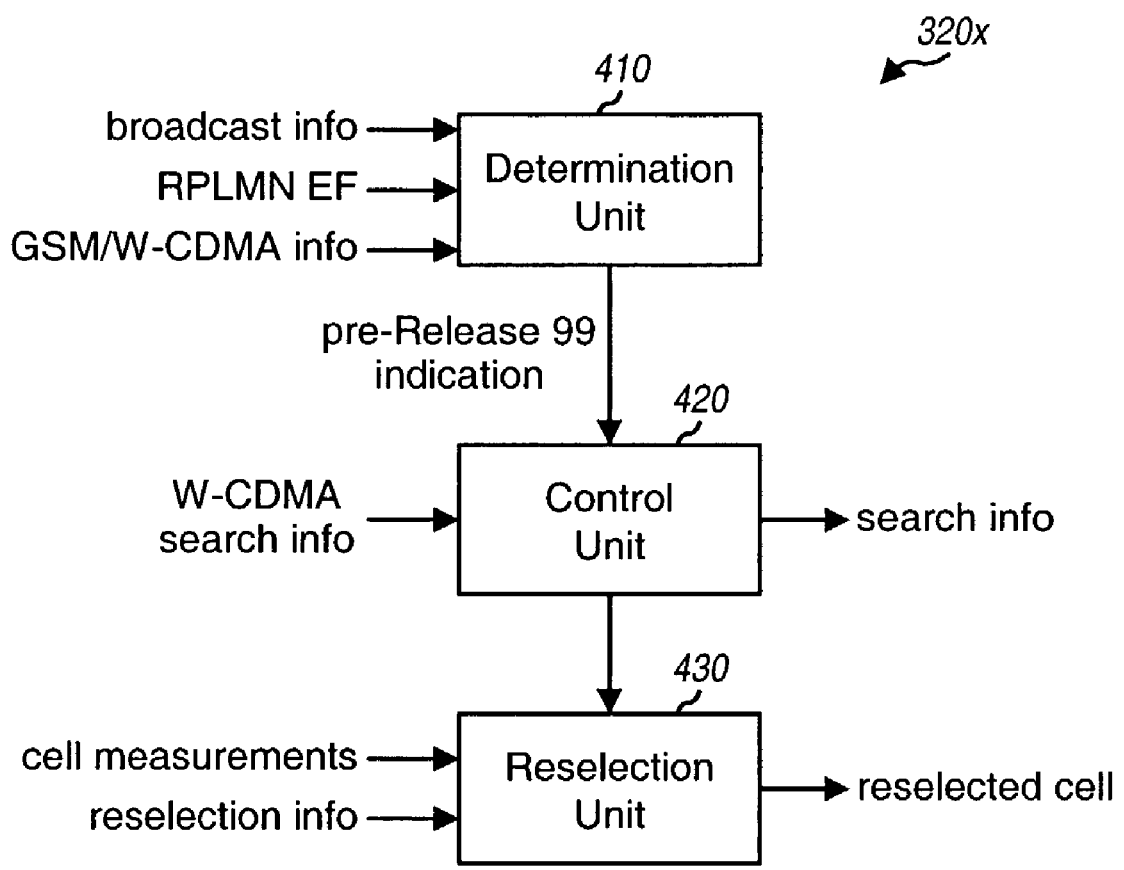
FIG. 4 shows a block diagram of a controller within the terminal.

FIG. 4 shows a block diagram of a controller 320x that can support GSM to W-CDMA reselection. Controller 320x may be an embodiment of controller 320 or may be implemented within controller 320. For this embodiment, controller 320x includes a determination unit 410, a control unit 420, and a reselection unit 430.

Determination unit 410 receives information used to ascertain whether or not the GSM network on which the terminal is currently camped on supports a pre-Release 99 version of GSM standard. Such information may includes, for example, (1) broadcast information, e.g., from a System Information Type 3 message, a System Information Type 13 message, or a Packet System Information Type 1 message received from the current GSM cell, (2) W-CDMA network information, e.g., from memory unit 322, and/or (3) some other information that may be used to determine whether or not to perform W-CDMA search, e.g., the last used access technology in the elementary file (EF) for the RPLMN. Unit 410 provides an indication for whether the current GSM network is deemed to support a pre-Release 99 version of the GSM standard (i.e., an indication to search or not to search for W-CDMA cells).

Control unit 420 receives various types of information used to initiate and control W-CDMA searches. Unit 420 receives the indication from unit 410 and initiates a W-CDMA search if the current GSM network is deemed to support a pre-Release 99 version of the GSM standard. Unit 420 may receive other information used to determine what to search and when to search. The scope of the search may be determined by W-CDMA information obtained from memory unit 322. The time to perform the search may be determined based on the T value from removable module 330, the $T_{WCDMA}$ value from memory unit 322, or some other information that may be used to determine when to perform the W-CDMA search. Unit 420 then provides search information indicative of when to perform a W-CDMA search and what frequencies and scrambling codes to search. Control unit 420 may then direct demodulator 316 to perform a search for W-CDMA cells and possibly GSM cells at the designated time.

Reselection unit 430 receives various types of information used to perform the cell reselection (e.g., the XXX_Qoffset and FDD_Qmin thresholds from memory unit 322, or some other information used to derive the necessary thresholds). Unit 430 also receives measurements for W-CDMA and GSM cells from demodulator 316. Unit 430 then selects the best cell to camp on and provides the identity of the reselected cell.

A W-CDMA search may also be performed in accordance with manual input received from a display and input/output (I/O) unit 340. The search results and/or the reselected cell may also be displayed for the user via unit 340.

For clarity, techniques have been described herein for supporting GSM to W-CDMA reselection. These techniques may also be used to support cell reselection between other types of networks such as, for example, from GSM to IS-2000, from IS-95 to IS-2000, from IS-95 to W-CDMA, and so on. In general, these techniques may be used for cell reselection between any two networks in which some release versions of a first network (e.g., a GSM network) does not broadcast information for neighbor cells in a second network (e.g., a W-CDMA network). (Later releases of the first network may or may not broadcast information for neighbor cells in the second network.) Some other means are the used to determine whether or not to search for cells in the second network when the neighbor cell information is not broadcast by the first network. Thus, the reference to "GSM to W-CDMA reselection" herein also generically denotes cell reselection between other types of wireless communication networks.

The cell reselection techniques described herein may be implemented by various means. For example, these techniques may be implemented in hardware, software, or a combination thereof. For a hardware implementation, the elements used to support the cell reselection as described herein (e.g., units 410, 420, and 430 in FIG. 4) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the cell reselection techniques described herein may be implemented with modules (e.g., procedures, functions, and so on) that perform the functions described herein. The software codes may be stored in a memory unit (e.g., memory unit 322 in FIG. 3) and executed by a processor (e.g., controller 320). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device operable to perform reselection from a GSM network to a CDMA network, comprising:
    a determination unit operative to ascertain whether the GSM network on which the wireless device is operating supports a pre-Release 99 version of GSM standard;
    a memory unit operative to store information used to search for CDMA cells, wherein the memory unit is operative to store identifiers of CDMA networks, frequencies used by CDMA cells, and scrambling codes used by CDMA cells, or any combination thereof;
    a control unit operative to initiate a search for CDMA cells if the GSM network is deemed to support a pre-Release 99 version of the GSM standard, wherein the search for CDMA cells is performed in accordance with information obtained from the memory unit;
    wherein the control unit is further operative to ascertain a particular time to perform the search for CDMA cells: and
    wherein the particular time to perform the search for CDMA cells is determined based on a specified time period between successive background searches in a home public land mobile network (HPLMN).

2. The device of claim 1, wherein the determination unit is operative to ascertain whether the GSM network supports a pre-Release 99 version of the GSM standard based on a broadcast message received from the GSM network.

3. The device of claim 1, wherein the determination unit is operative to ascertain whether the GSM network supports a pre-Release 99 version of the GSM standard based on information stored by the device for the GSM network.

4. The device of claim 1, wherein the control unit is operative to initiate a search for CDMA cells if an elementary file for a last registered public land mobile network (RPLMN) indicates GSM was a last used access technology.

5. The device of claim 1, further comprising:
    a memory unit operative to store information associating GSM networks and CDMA networks, and wherein the determination unit is operative to ascertain whether the GSM network supports a pre-Release 99 version of the GSM standard based on the information associating GSM networks and CDMA networks.

6. The device of claim 1, wherein the information stored in the memory unit is obtained from CDMA cells previously operated on by the device.

7. The device of claim 1, wherein the memory unit is operative to store information associating CDMA networks and GSM networks, and wherein the search for CDMA cells is dependent on the GSM network.

8. The device of claim 1, wherein the control unit is operative to initiate an exhaustive search for CDMA cells.

9. The device of claim 1, wherein the control unit is further operative to receive measurements from the search for CDMA cells and to determine whether or not to reselect to a CDMA cell based on the measurements.

10. The device of claim 9, wherein the determination for whether or not to reselect to a CDMA cell is further based on an offset threshold used for comparing measurements for GSM cells and CDMA cells.

11. The device of claim 10, wherein the offset threshold is derived from an offset used for reselecting from the CDMA network to the GSM network.

12. The device of claim 1, wherein the CDMA network is a W-CDMA network.

13. The device of claim 1, wherein the CDMA network is an IS-2000 network.

14. An integrated circuit operable to support reselection from a GSM network to a CDMA network, comprising:
    a determination unit operative to ascertain whether the GSM network on which a wireless device is operating supports a pre-Release 99 version of GSM standard;
    a memory unit operative to store information used to search for CDMA cells, wherein the memory unit is operative to store identifiers of CDMA networks, frequencies used by CDMA cells, and scrambling codes used by CDMA cells, or any combination thereof;
    a control unit operative to initiate a search for CDMA cells if the GSM network is deemed to support a pre-Release 99 version of the GSM standard;
    wherein the search for CDMA cells is performed in accordance with information obtained from the memory unit;
    wherein a particular time to perform the search for CDMA cells is ascertained; and
    wherein the particular time to perform the search for CDMA cells is determined based on a specified time period between successive background searches in a home public land mobile network (HPLMN).

15. The integrated circuit of claim 14, wherein the CDMA network is a W-CDMA network.

16. An apparatus operable to support reselection from a GSM network to a CDMA network, comprising:
    means for ascertaining whether the GSM network on which a wireless device is operating supports a pre-Release 99 version of GSM standard;
    means for storing information used to search for CDMA cells, wherein the memory unit is operative to store identifiers of CDMA networks, frequencies used by CDMA cells, and scrambling codes used by CDMA cells, or any combination thereof;
    means for initiating a search for CDMA cells if the GSM network is deemed to support a pre-Release 99 version of the GSM standard, wherein the search for CDMA cells is performed in accordance with information obtained from the means for storing information; and
    means for ascertaining a particular time to perform the search for CDMA cells, wherein the particular time to perform the search for CDMA cells is determined based on a specified time period between successive background searches in a home public land mobile network (HPLMN).

17. The apparatus of claim 16, further comprising:
    means for obtaining information used to search for CDMA cells, and wherein the search for CDMA cells is performed in accordance with the obtained information.

18. The apparatus of claim 16, further comprising:
means for determining a particular time to perform the search for CDMA cells, and wherein the search for CDMA cells is performed at the particular time.

19. The apparatus of claim 16, wherein the CDMA network is a W-CDMA network.

20. A method of performing reselection from a GSM network to a CDMA network, comprising:
ascertaining whether the GSM network on which a wireless device is operating supports a pre-Release 99 version of GSM standard;
storing information used to search for CDMA cells in a memory unit in a wireless device, wherein the memory unit is operative to store identifiers of CDMA networks, frequencies used by CDMA cells, and scrambling codes used by CDMA cells, or any combination thereof;
initiating a search for CDMA cells if the GSM network is deemed to support a pre-Release 99 version of the GSM standard, wherein the search for CDMA cells is performed in accordance with information obtained from the memory unit; and
ascertaining a particular time to perform the search for CDMA cells, wherein the particular time to perform the search for CDMA cells is determined based on a specified time period between successive background searches in a home public land mobile network (HPLMN).

21. The method of claim 20, further comprising:
obtaining information used to search for CDMA cells, and wherein the search is performed in accordance with the obtained information.

22. The method of claim 20, wherein the CDMA network is a W-CDMA network.

23. A method of performing reselection from a GSM network to a CDMA network, comprising:
ascertaining whether the GSM network on which a wireless device is operating supports a pre-Release 99 version of GSM standard:
storing information used to search for CDMA cells in a memory unit in a wireless device, wherein the memory unit is operative to store identifiers of CDMA networks, frequencies used by CDMA cells, and scrambling codes used by CDMA cells, or any combination thereof;
initiating a search for CDMA cells if the GSM network is deemed to support a pre-Release 99 version of the GSM standard, wherein the search for CDMA cells is performed in accordance with information obtained from the memory unit; and
wherein initiating the search for CDMA cells further comprises initiating when an elementary file for a last registered public land mobile network (RPLMN) indicates GSM was a last used access technology.

24. An integrated circuit operable to support reselection from a GSM network to a CDMA network, comprising:
a determination unit operative to ascertain whether the GSM network on which a wireless device is operating supports a pre-Release 99 version of GSM standard;
a memory unit operative to store information used to search for CDMA cells, wherein the memory unit is operative to store identifiers of CDMA networks, frequencies used by CDMA cells, and scrambling codes used by CDMA cells, or any combination thereof;
a control unit operative to initiate a search for CDMA cells if the GSM network is deemed to support a pre-Release 99 version of the GSM standard;
wherein the search for CDMA cells is performed in accordance with information obtained from the memory unit; and
wherein initiating the search for CDMA cells further comprises initiating when an elementary file for a last registered public land mobile network (RPLMN) indicates GSM was a last used access technology.

25. An apparatus operable to support reselection from a GSM network to a CDMA network, comprising:
means for ascertaining whether the GSM network on which a wireless device is operating supports a pre-Release 99 version of GSM standard:
means for storing information used to search for CDMA cells, wherein the memory unit is operative to store identifiers of CDMA networks, frequencies used by CDMA cells, and scrambling codes used by CDMA cells, or any combination thereof; means for initiating a search for CDMA cells if the GSM network is deemed to support a pre-Release 99 version of the GSM standard, wherein the search for CDMA cells is performed in accordance with information obtained from the means for storing information; and
wherein the means for initiating the search for CDMA cells further comprises means for initiating when an elementary file for a last registered public land mobile network (RPLMN) indicates GSM was a last used access technology.

* * * * *